United States Patent [19]

Mayes

[11] Patent Number: 4,593,475
[45] Date of Patent: Jun. 10, 1986

[54] LEVEL WITH SLOTTED MAGNET SUPPORT

[75] Inventor: Daniel J. Mayes, Johnson City, Tenn.

[73] Assignee: Great Neck Saw Manufacturing, Inc., Mineola, N.Y.

[21] Appl. No.: 723,455

[22] Filed: Apr. 15, 1985

[51] Int. Cl.$^4$ .................................... G01C 9/28
[52] U.S. Cl. ........................... 33/347; 33/371; 33/DIG. 1
[58] Field of Search .................. 33/371, 347, DIG. 1, 33/381

[56] References Cited

U.S. PATENT DOCUMENTS

| | | | |
|---|---|---|---|
| 2,535,791 | 12/1950 | Fluke | 33/347 |
| 2,789,363 | 4/1957 | Miley | 33/DIG. 1 |
| 2,790,069 | 4/1957 | Alexander | 33/381 X |
| 3,213,545 | 10/1965 | Wright | 33/347 |
| 3,499,225 | 3/1970 | Darrah | 33/347 |
| 3,820,249 | 6/1974 | Stone | 33/347 |

Primary Examiner—William D. Martin, Jr.
Attorney, Agent, or Firm—Charles L. Lovercheck; Wayne L. Lovercheck; Dale R. Lovercheck

[57] ABSTRACT

A level is disclosed having a body with two working surfaces. One of the working surfaces is formed on a magnetic rubber strip. The magnet has a longitudinal groove formed in the working surface which can receive a corner or a side of a pipe to be leveled or plumbed, thus preventing the level from moving laterally on the pipe, corner or projection.

2 Claims, 11 Drawing Figures

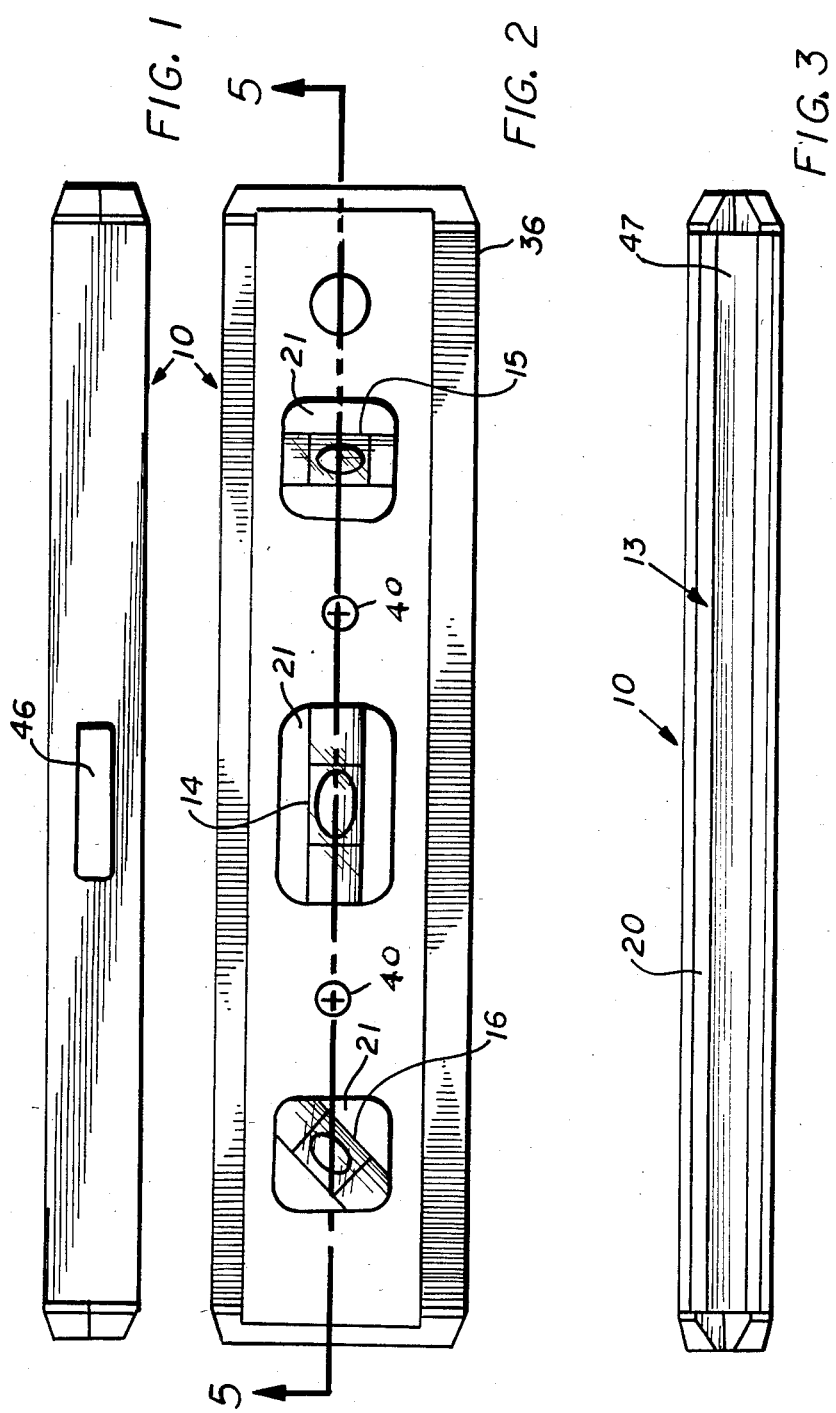

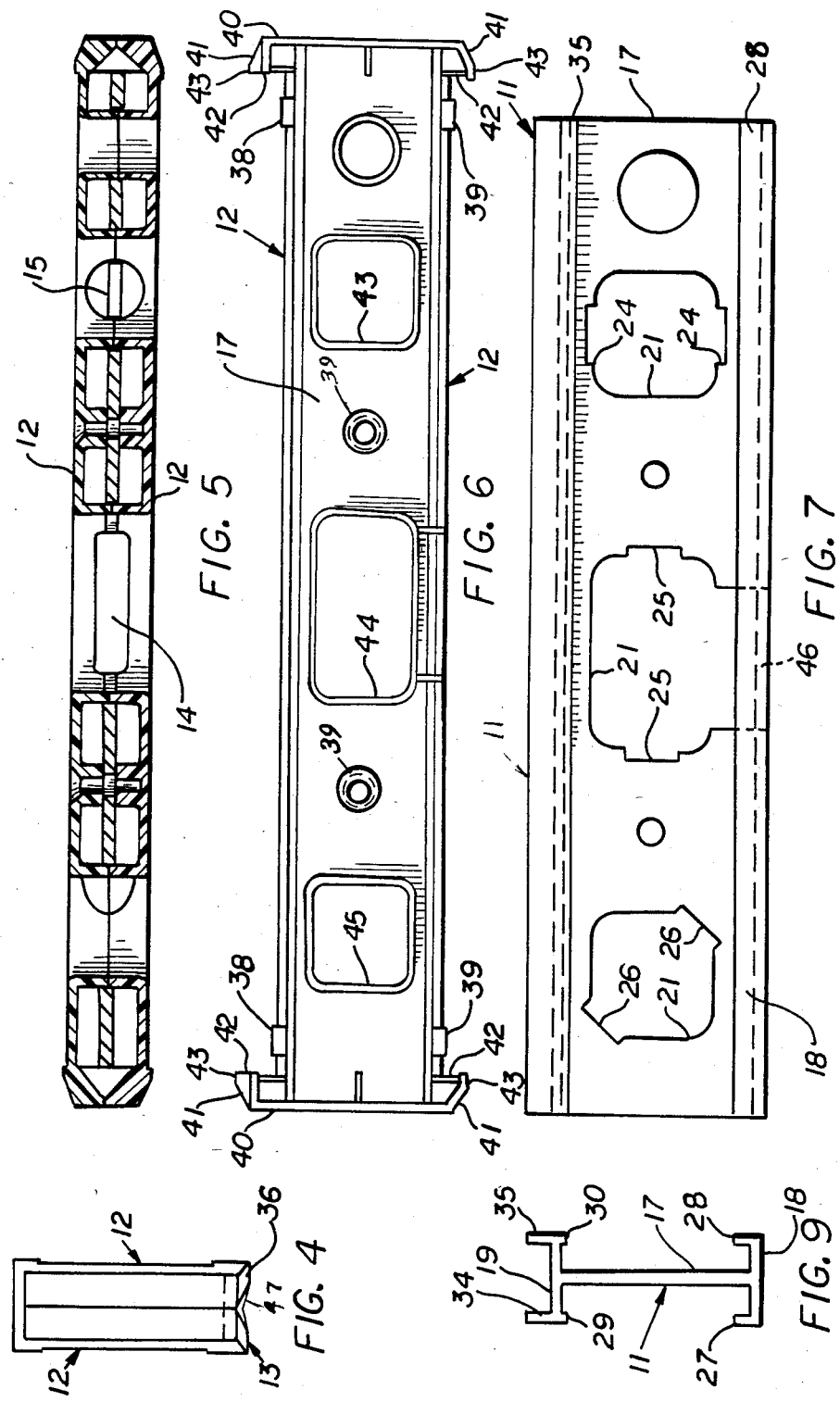

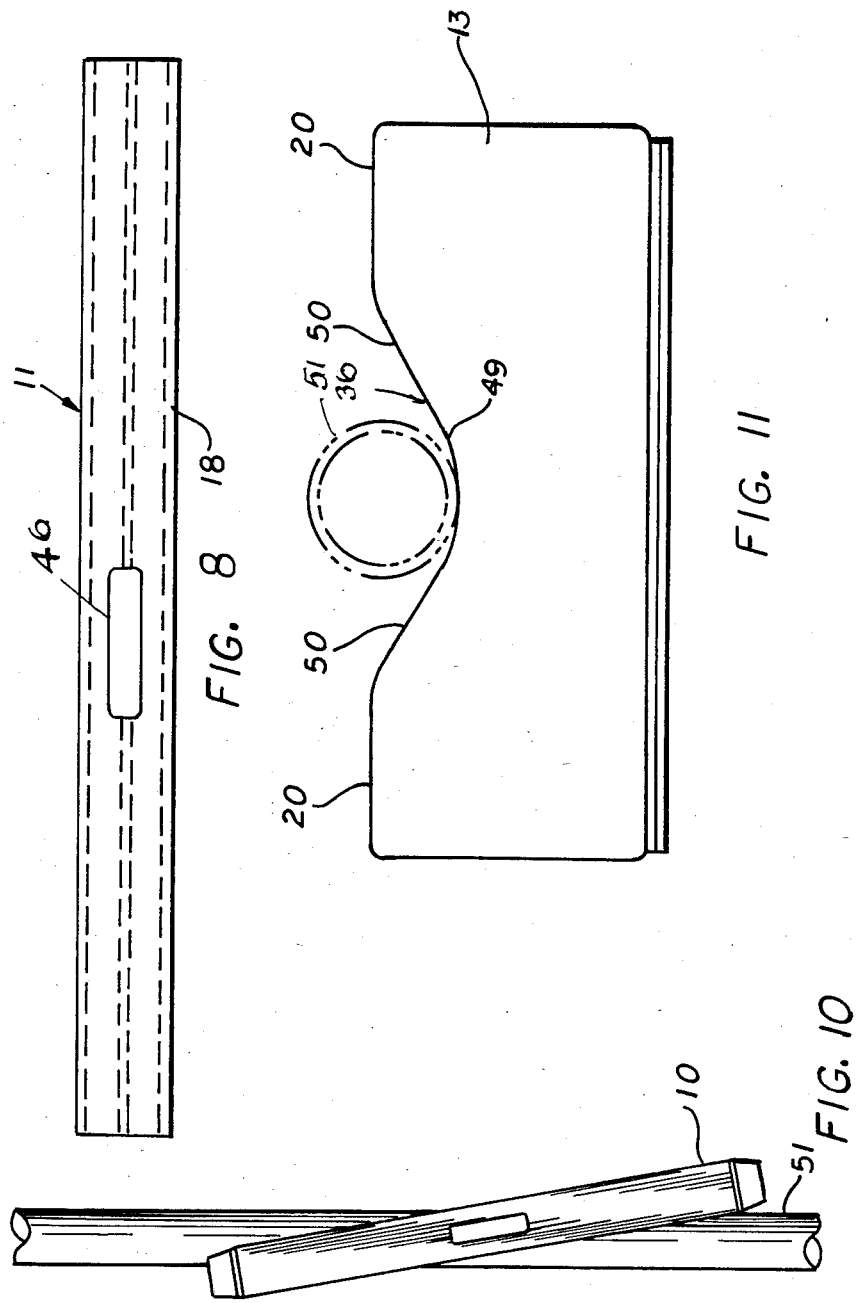

LEVEL WITH SLOTTED MAGNET SUPPORT

BACKGROUND OF THE INVENTION

This invention relates to levels and more particularly to levels used by carpenters, electricians, plumbers and other mechanics for leveling pipes, rods and other structural structures to insure that such structures are plumb and level. Typically, such levels are made with two spaced parallel flanges held in spaced relation to each other by means of a web. Each flange having a flat working surface on its outer side. The web typically has one or more holes formed in it and diametrically spaced notches are formed at the sides of each hole to receive the ends of a level vial. The vials may be held in place by side plates provided, one at each side of the web holding the vials from moving and the ends of the vials out of the notches. An example of a typical level constructed as above is shown in U.S. Pat. No. 3,311,990 issued to Donald E. Wright in 1967. Prior levels have been provided with a magnet on one side and a longitudinal groove in the other working surface. For example, U.S. Pat. No. 3,311,990 was made with a slot in the working surface on the opposite side of the level from the magnet to position the level on a pipe or structural member and to hold the level in position in alignment with the pipe to prevent the level from slipping. Other levels were made with magnets built in to hold the level in position. Applicant is not aware of any prior use of a level having a groove wherein a magnet itself has a groove.

SHORT STATEMENT OF THE INVENTION

Accordingly the level disclosed is made up of a metal frame having two flanges which are integrally connected by a web. The flanges each have several holes in them wich are provided with diametrically spaced notches at the sides of the holes and the ends of level vials in these notches. A side plate is provided at each side of the level to hold the level vials in position and means is provided to hold the side plates against the vials. The side plates each have holes that register with holes in the web and provide openings through which the level vial can be observed and the level can be read. A magnetic rubber strip is attached to one working surface of the level and a longitudinal groove is provided in the rubber. When a pipe or corner or other similar structure, such as a pipe or corner of a structure, is received in the groove, the groove will hold the level in alignment with the pipe or structure. This prevents the level from moving on the pipe when a plumber, carpenter or mechanic to take his hand off the level when it is in position on the pipe. The plumber or carpenter can thus use both of his hands for securing the pipe or other work.

OBJECTS OF THE INVENTION

It is an object of the invention to provide an improved level.

Another object of the invention is to provide a level that is simple in contruction, economical to manufacture and simple and efficient to use.

Another object of the invention is to provide a level with a permanent magnet on one working side. The permanent magnet has a longitudinal groove which will receive iron pipe or steel corner or tubing and hold the level in place.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF DRAWINGS

FIG. 1 is a top view of the level according to the invention.

FIG. 2 is a side view of the level shown in FIG. 1.

FIG. 3 is a bottom view of the level.

FIG. 4 is an end view of the level.

FIG. 5 is a cross sectional view taken on line 5—5 of FIG. 2.

FIG. 6 is a side view of the side plate.

FIG. 7 is a side view of the frame of the level.

FIG. 8 is a top view of the frame of the level.

FIG. 9 is an end view of the frame of the level.

FIG. 10 an illustration of an ordinary level according to the prior art in use aligning a pipe.

FIG. 11 is an enlarged end view of the magnetic rubber element showing the element in position aligning a pipe.

DETAILED DESCRIPTION OF DRAWINGS

Now with more particular reference to the drawings, referring in detail to FIGS. 1-9, the application discloses a spirit level 10 having a frame 11 with vials supported on the frame. The frame 11 has a web 17, a first flange 18 and a second flange 19 integrally connected together by the web 17. The web 17 has openings 21 which receive the vials 14, 15 and 16. The ends of vials 14, 15 and 16 are received in the notches 24, 25 and 26 respectively which are diametrically spaced in the openings 21. The flange 18 has the inwardly directed ends 27 and 28 which receive edges the side panels 12 under them. The flange 19 has downwardly extending ribs 29 and 30 which receive one side of the side panels 12 so that the side edge of one of panels 12 can be snapped into place under ends 27 and 29. The other panel 12 can be snapped in place under ends 29 and 30. The flange 19 has upwardly extending ends 34 and 35 which receive the magnetic rubber strip 13. The magnetic rubber strip 13 may be cemented in place or otherwise held. The magnetic rubber strip 13 has a groove 36 formed in its outside surface and extends from one end of the level to the other. When the level is used to position a pipe 51, for example, the groove 36 will receive the pipe 50 or other structural member to hold the level in alignment.

Side panels 12 have edge tab members 38 and 39 that snap under the ribs 27, 28, 29, and 30, thereby holding side panels 12 in place. The side panels 12 have holes in them indicated at 39. The holes 39 receive a screw 40 which is threadably received in the opposite panels and holds the two side panels in place. The side panels engage the side edges of vials 14, 15 and 16 and prevent them from moving laterally out of the notches 24, 25 and 26. The side panels 12 have enlarged ends 42 which are tapered outwardly and toward the center at 41 and provides a tapered end which makes it easy for a mechanic to slip the level into his pocket. The side panels 12 have shoulders 42 which engage the ends of the frame flat outer surfaces 43 and provide a smooth continuous surface of transition from the end of the frame to the end members 41. The side panels 12 have holes 43, 44 and 45 which provide windows that overlie the holes 21 in the frame and expose vials 14, 15 and 16 to view and allow the vials to be viewed from the side.

A window 46 is provided in the top of the frame through which the vial 14 can be viewed. The rubber magnet strip 13 is a piece of flexible nonmetallic material shown in an enlarged view in FIG. 11. The flexible material may be rubber or suitable plastic containing particles of permanent magnet material. The rubber magnet 13 has a groove 47 which has an arcuate part 49 which flares outwardly at its sides at 50 at an angle of about 30° to the working surface at 20. FIG. 10 shows how the level not having a groove in its working surface 20 will twist relative to the pipe 51 and not remain in alignment with the central axis of the pipe 51. The groove in the magnetic member is designed to prevent the level from twisting when levelling a pipe or corner. The grooved magnetic surface has an additiional advantage in all applications. A single vial having a barrel shaped interior is now frequently used in levels instead of two arcuate vials to enable two working surfaces of a level to be used. These barrel shaped vials are molded and they are frequently accurate on three directions, but not perfectly accurate in a fourth direction. By aligning the accurate side of the vial with the side of the level having the groove, and using the magnetic side as the working side at all times, a more accurate level will result.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A level comprising a body,
   said body comprising two spaced flanges,
   a web member integrally attached to said flanges holding said flanges in spaced relation,
   said web member having at least one opening therein,
   a vial received in said opening,
   said first flange being fixed to a first side of said web,
   said second flange being fixed to a second side of said web,
   said first flange having a recess therein extending from one end of the body to the other,
   a rubber magnet received in said recess and a working surface on said rubber magnet parallel to the longitudinal axis of said level vial and extending from one end of said flange to the other,
   a longitudinal groove in said rubber magnet extending from said one end thereof to the other and adapted to receive a part of an iron pipe or the corner of two magnetic members disposed at an angle to each other to be leveled or plumbed whereby said level is held in alignment with said pipe, whereby said magnet continuously exerts a magnetic force over the part of said pipe or the part of said corner member that is engaged by said magnetic rubber and is adapted to hold said level in alignment with said pipe.

2. The level recited in claim 1 wherein said web has a plurality of said openings,
   a notch in said web at diametrically opposite sides of said opening,
   a plurality of said vials,
   each said vial having two opposite ends,
   each said vial end being received in one of said notches.

* * * * *